(12) United States Patent
Sunder

(10) Patent No.: US 8,208,914 B1
(45) Date of Patent: Jun. 26, 2012

(54) SYSTEM AND METHOD FOR TRANSPARENT COMMUNICATION OVER A WIRELESS COMMUNICATION NETWORK

(75) Inventor: Arockia Sunder, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 1163 days.

(21) Appl. No.: 11/562,799

(22) Filed: Nov. 22, 2006

Related U.S. Application Data

(60) Provisional application No. 60/741,504, filed on Nov. 30, 2005.

(51) Int. Cl.
*H04M 3/00* (2006.01)
*G06F 15/16* (2006.01)

(52) U.S. Cl. ....................... 455/420; 709/206

(58) Field of Classification Search .................. 455/420; 709/206
See application file for complete search history.

(56) References Cited

U.S. PATENT DOCUMENTS

| 2002/0112014 A1* | 8/2002 | Bennett et al. | 709/206 |
| 2006/0155865 A1* | 7/2006 | Brandt et al. | 709/230 |

* cited by examiner

*Primary Examiner* — Kamran Afshar
*Assistant Examiner* — Omoniyi Obayanju

(57) ABSTRACT

Systems and methods for transparent communications over a wireless network between a control station and a remote device are disclosed. A wireless module is communicatively coupled with the remote device and configured for wireless communications with the control station. Communications from the control station to the remote device are sent by the control station to the wireless module using a simple modem application reliable transfer ("SMART") protocol that enables the wireless module to receive the communication from the control station via a wireless network service such as the short message service ("SMS") and then deliver the communication to the remote device via an interface as if the communication was sent directly to the remote device from the control station via the interface. In turn, communications from the remote device to the control station are sent by the remote device to the wireless module using the SMART protocol that enables the wireless module to deliver the communication from the remote device to the control station using a wireless network service, such as SMS, that the remote device is incapable of using.

16 Claims, 6 Drawing Sheets

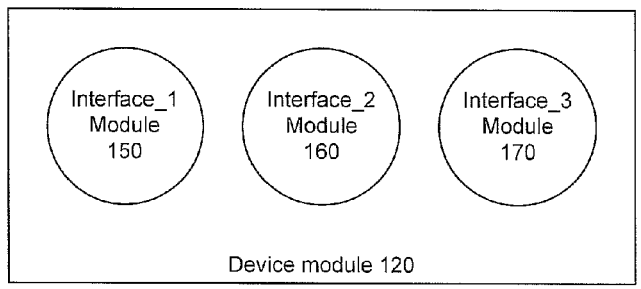
FIG. 7
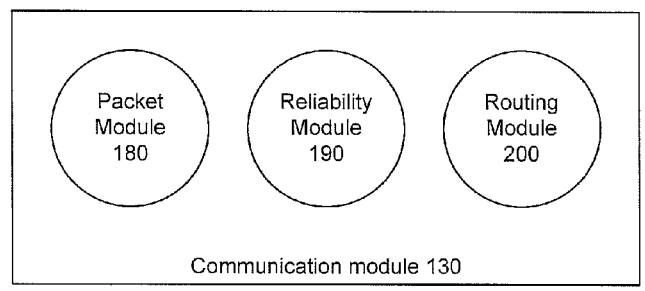
FIG. 8
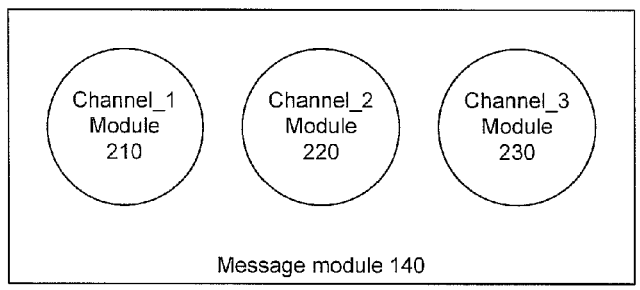
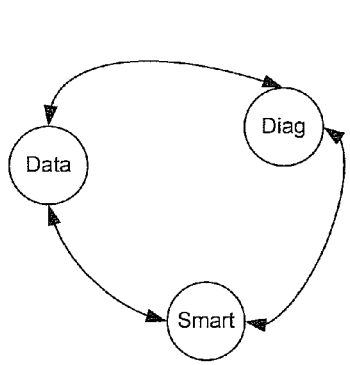
FIG. 6A
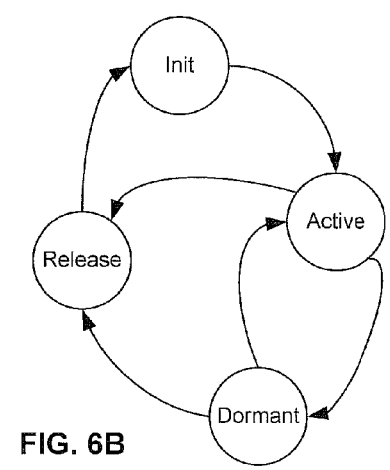
FIG. 6B

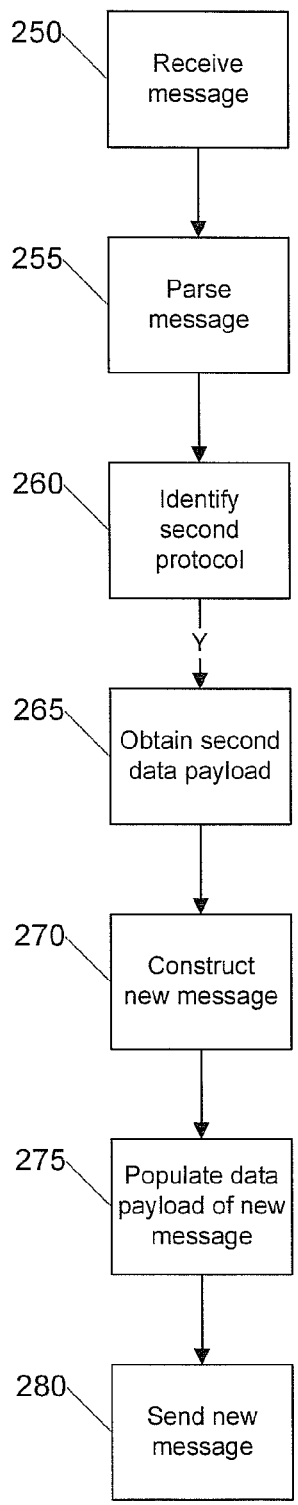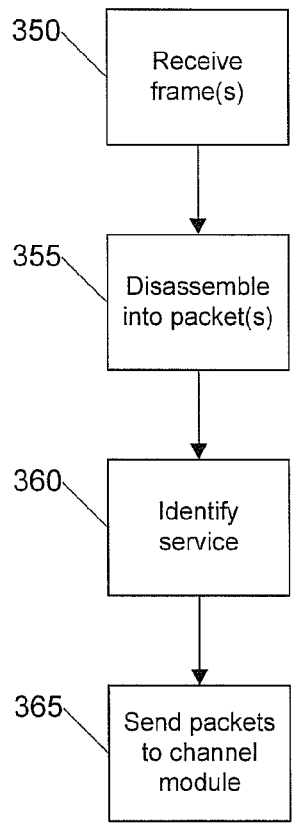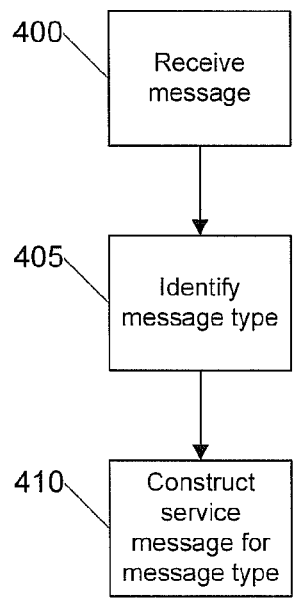
FIG. 10
FIG. 11
FIG. 12

SYSTEM AND METHOD FOR TRANSPARENT COMMUNICATION OVER A WIRELESS COMMUNICATION NETWORK

RELATED APPLICATIONS

This application claims the benefit of U.S. Provisional Application 60/741,504, filed Nov. 30, 2005, which is hereby incorporated by reference.

FIELD OF THE INVENTION

The present invention generally relates to wireless communication devices and services and more particularly relates to remote communications between a control device and a remote device via a wireless communication device.

BACKGROUND

Conventional wireless communication diagnostic solutions are insufficient in that they do not provide any reliability for the communications. Furthermore, conventional solutions lack any implementation of security and are not platform independent. Conventions solutions are typically tied to a particular chipset and provide only a basic diagnostic utility that is capable of testing a remote device and determining its state. These conventional solutions are also hampered by their master and slave implementations.

Conventional wireless modules also suffer from the inability to provide any functionality above and beyond replacing a direct wired link between a control station and a piece of equipment with a wireless link between the control station and the equipment. These conventional wireless modules merely extend the distance between the control station and the equipment but do not extend the functionality of communications between the control station and the equipment. These drawbacks of the conventional systems result in less than desirable communications between a control station and the equipment. Accordingly, what is needed is a system and method that addresses these problems with the conventional systems.

SUMMARY

Accordingly, described herein are systems and methods for transparent communications over a wireless network between a control station and a remote device. A wireless module is communicatively coupled with the remote device and configured for wireless communications with the control station. Communications from the control station to the remote device are sent by the control station to the wireless module using a simple modem application reliable transfer ("SMART") protocol that enables the wireless module to receive the communication from the control station via a wireless network service such as the short message service ("SMS") and then deliver the communication to the remote device via an interface as if the communication was sent directly to the remote device from the control station via the interface. In turn, communications from the remote device to the control station are sent by the remote device to the wireless module using the SMART protocol that enables the wireless module to deliver the communication from the remote device to the control station using a wireless network service, such as SMS, that the remote device is incapable of using.

The present invention further relates to machine readable media on which are stored embodiments of the present invention. It is contemplated that any media suitable for storing instructions is within the scope of the present invention. By way of example, such media may take the form of magnetic, optical, or semiconductor media. The invention also relates to data structures that contain embodiments of the present invention, and to the transmission of data structures containing embodiments of the present invention. Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 6A is a block diagram illustrating a set of example service states according to an embodiment of the present invention;

FIG. 6B is a flow diagram illustrating an example of state transitions according to an embodiment of the present invention;

FIG. 7 is a block diagram illustrating an example device module according to an embodiment of the present invention;

FIG. 8 is a block diagram illustrating an example communication module according to an embodiment of the present invention;

FIG. 9 is a block diagram illustrating an example message module according to an embodiment of the present invention;

FIG. 10 is a flow diagram illustrating an example process for transparent communication over a wireless network according to an embodiment of the present invention;

FIG. 11 is a flow diagram illustrating an example process for handling service specific communications according to an embodiment of the present invention;

FIG. 12 is a flow diagram illustrating an example process for constructing a service message according to a message type according to an embodiment of the present invention;

DETAILED DESCRIPTION

Certain embodiments as disclosed herein provide for systems and methods for transparent communications over a wireless network between a control station and a remote device. For example, one system provides for a wireless module communicatively coupled with the remote device and configured for wireless communications with the control station. Communications within the system going from the control station to the remote device are sent by the control station to the wireless module using a simple modem application reliable transfer ("SMART") protocol that enables the wireless module to receive the communication from the control station via a wireless network service such as the short message service ("SMS") and then deliver the communication to the remote device via an interface as if the communication was sent directly to the remote device from the control station via the interface.

Furthermore, communications within the system going from the remote device to the control station are sent by the remote device to the wireless module using the SMART protocol that enables the wireless module to deliver the communication from the remote device to the control station using a wireless network service that the remote device is incapable of using, such as SMS.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
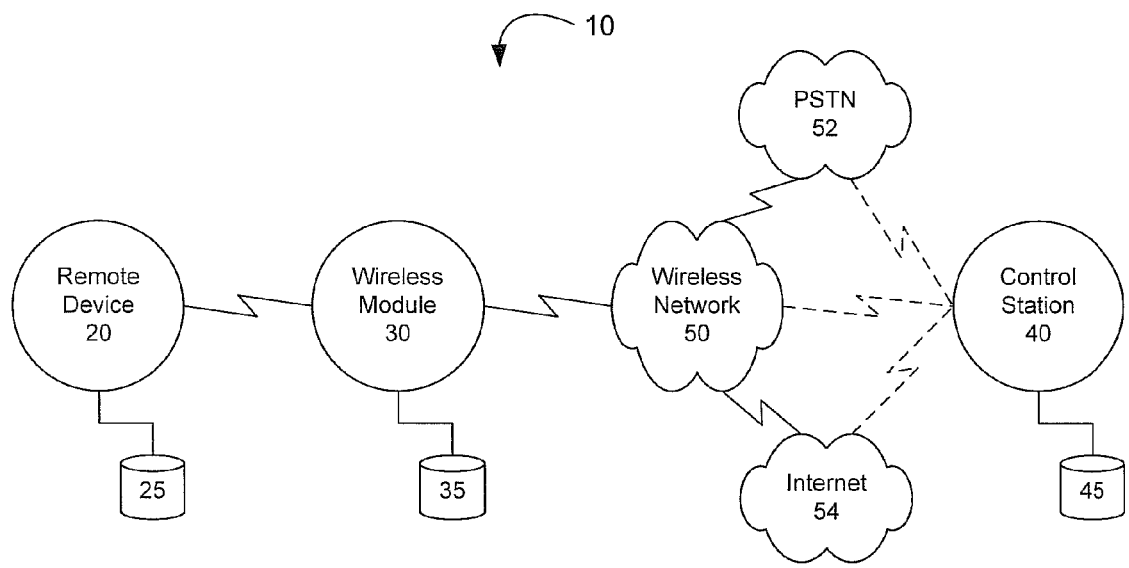
FIG. 1 is a block diagram illustrating an example system for transparent communication over a wireless network according to an embodiment of the present invention.

FIG. 1 is a block diagram illustrating an example system 10 for transparent communication over a wireless network 50 according to an embodiment of the present invention. In the illustrated embodiment, the system 10 comprises a remote device 20 configured with a data storage area 25 and a wireless module 30 configured with a data storage area 35. The remote device 20 and wireless module 30 are communicatively coupled and the wireless module 30 is communicatively coupled with a control station 40 through wireless network 50. The control station 40 is configured with a data storage area 45 and may alternatively or additionally communicate with wireless module 30 via other networks such as public switched telephone network 52 and the Internet 54.

As is well understood, the networks 50, 52, and 54 may comprise a plurality of networks including private, public, circuit switched, packet switched, personal area networks ("PAN"), local area networks ("LAN"), wide area networks ("WAN"), metropolitan area networks ("MAN"), or any combination of the these. Other network types may also be included as needed to facilitate communication between the control station 40 and the wireless module 30.

In alternative implementations, there may be more than just a single remote device 20, wireless module 30, and control station 40, as will be understood by those having skill in the art. For the sake of simplicity of this description, however, the embodiment described will include just one of each. Furthermore, in alternative implementations there may be more than just a single wireless network 50 and additional other networks, as will also be understood by those having skill in the art. For the sake of simplicity of this description, however, the embodiment described will include a single wireless network 50 and no additional networks.

The remote device 20 can be any of a variety of computing devices including a personal computer ("PC"), server computer, personal digital assistant ("PDA"), laptop computer, special purpose equipment, or any combination of these and other devices capable of establishing a communication link with the wireless module 30 and receiving instruction from control station 40. An example general purpose computing device is later described with respect to FIG. 14.

The wireless module 30 can be any of a variety of wireless communication devices, including a cell phone, PDA, laptop computer, PC card, or any combination of these and other devices capable of establishing a communication link with a remote device 20. An example general purpose wireless device is later described with respect to FIG. 13.

The control station 40 can be any of a variety of computing devices including a general purpose computer, PC, server computer, personal digital assistant PDA, laptop computer, general purpose wireless device, special purpose equipment, or any combination of these and other devices capable of establishing a communication link with the wireless module 30 and providing instruction to remote device 20. An example general purpose computing device is later described with respect to FIG. 14.

The data storage areas 25, 35, and 45 can be any sort of internal or external memory device and may include both persistent and volatile memories. The function of the data storage areas 25, 35, and 45 is to maintain data for long term storage and also to provide efficient and fast access to instructions for applications that being executed by the respective device or module.

Figure 2:
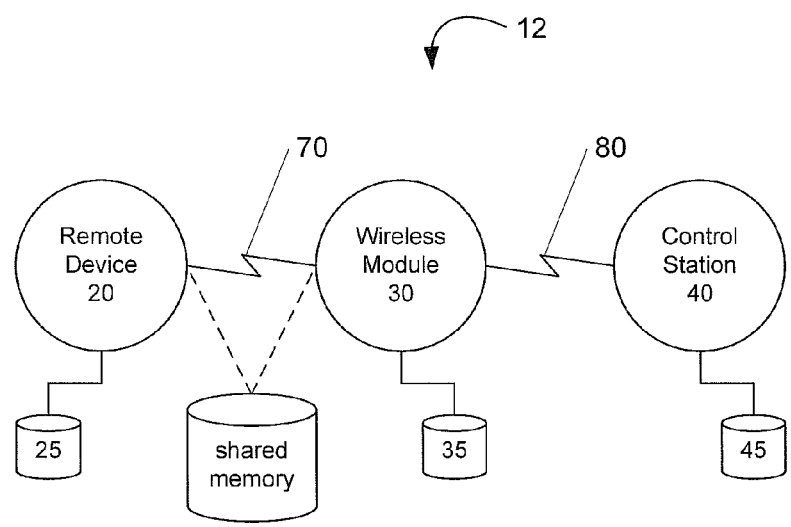
FIG. 2 is a block diagram illustrating an example system for transparent communication according to an embodiment of the present invention.

FIG. 2 is a block diagram illustrating an example system 12 for transparent communication according to an embodiment of the present invention. In the illustrated embodiment, the wireless module 30 is communicatively coupled with the remote device 20 through a communication link 70. Wireless module 30 is also communicatively coupled with the control station 40 through a communication link 80.

The communication link 70 can be any of a variety of communication links such as a direct wire connection such as a universal serial bus ("USB") or a universal asynchronous receiver transmitter ("UART"), RS-232, personal computer memory card international association ("PCMCIA"), direct wireless such as Bluetooth or infrared, a shared memory, or a network, just to name a few. The communication link 70 can also be a combination of connections, for example a USB connection from the remote device 20 to a shared memory module and a separate USB connection from the wireless module 30 to the same shared memory module, as illustrated. The communication link 80 can also be a variety of communication links such as the various networks previously described with respect to FIG. 1. In one embodiment, the communication link 80 includes a wireless segment (either direct or network) that terminates at the wireless module 30.

Figure 3A:
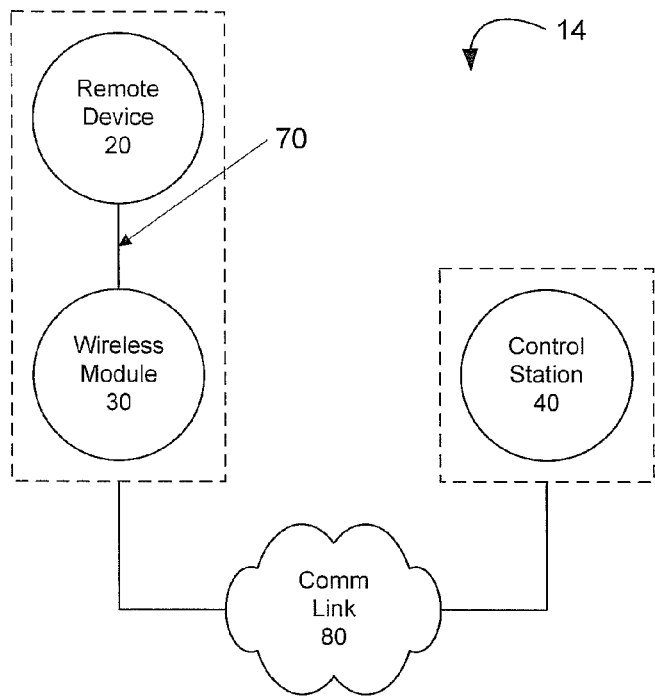
FIG. 3A is a block diagram illustrating an example system for transparent communication according to an embodiment of the present invention.

FIG. 3A is a block diagram illustrating an example system 14 for transparent communication according to an embodiment of the present invention. In the illustrated embodiment, the remote device 20 is communicatively coupled with a wireless module 30 via a communication link 70. The wireless module 30 is also communicatively coupled with the control station 40 via a communication link 80.

As shown in the illustrated embodiment, the wireless module 30 is logically combined with the remote device 20 such that communications from the remote device 20 to the wireless module 30 that are then sent to the control station 40 via the communication link 80 appear to the control station 40 as if they were sent directly by the remote device 20. For example, the remote device 20 may send a communication to the wireless module 30 via communication link 70. That communication uses the SMART protocol and identifies a particular service for the wireless module 30 to employ when sending the message along to the control station 40. The wireless module 30 then uses the identified service to send the message from the remote device 20 to the control station 40.

At the control station 40, the message is received via the service as if the message was sent directly from the remote device 20 using the service. The service can be, for example, simple text, binary data, audio tones, SMS, voice, internet protocol data, radio, user interface, system configuration, or the like.

Figure 3B:
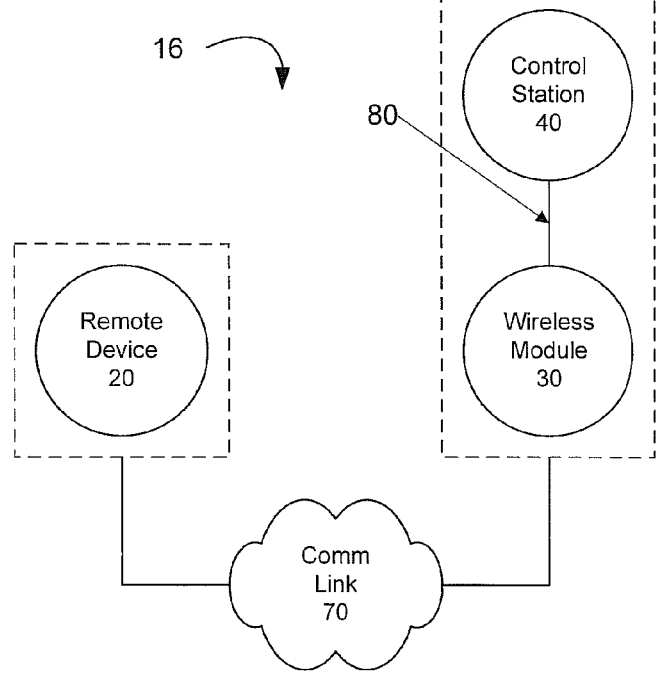
FIG. 3B is a block diagram illustrating an example system for transparent communication according to an embodiment of the present invention.

FIG. 3B is a block diagram illustrating an example system 16 for transparent communication according to an embodiment of the present invention. In the illustrated embodiment, the remote device 20 is communicatively coupled with a wireless module 30 via a communication link 70. The wireless module 30 is also communicatively coupled with the control station 40 via a communication link 80.

As shown in the illustrated embodiment, the wireless module 30 is logically combined with the control station 40 such that communications from the control station 40 to the wireless module 30 that are then sent to the remote device 20 via the communication link 70 appear to the remote device 20 as if they were sent directly by the control station 40. For example, the control station 40 may send a communication to the wireless module 30 via communication link 80. That communication uses the SMART protocol and identifies a particular service for the wireless module 30 to employ when sending the message along to the remote device 20. The wireless module 30 then uses the identified service to send the message from the control station 40 to the remote device 20. At the remote device 20, the message is received via the service as if the message was sent directly from the control station 40 using the service. The service can be, for example, simple text, binary data, audio tones, SMS, voice, internet protocol data, radio, user interface, system configuration, or the like.

Figure 4:
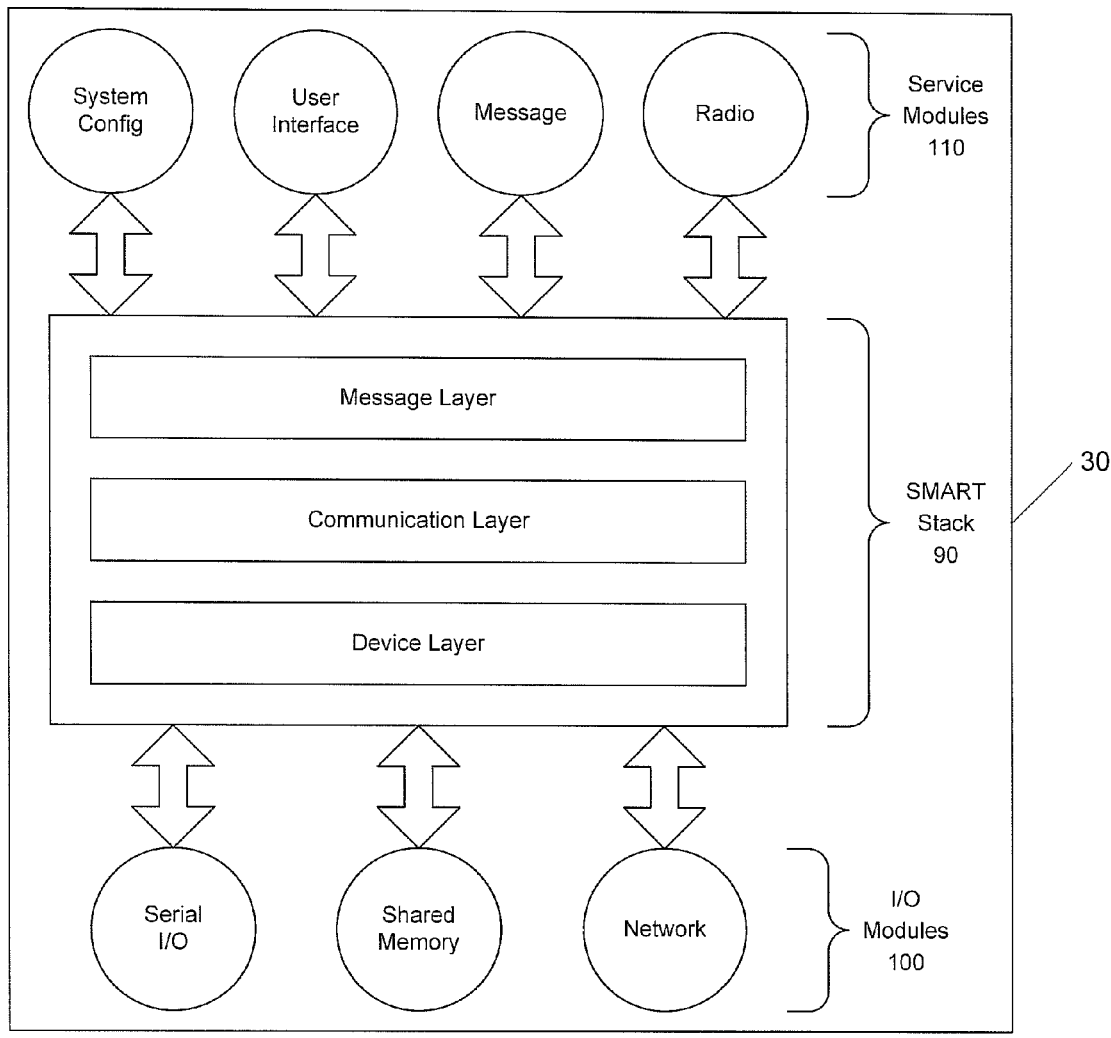
FIG. 4 is a block diagram illustrating an example wireless module according to an embodiment of the present invention.

FIG. 4 is a block diagram illustrating an example wireless module 30 according to an embodiment of the present invention. In the illustrated embodiment, the wireless module 30 comprises a plurality of service modules 110, a plurality of input/output ("I/O") modules 100, and a SMART protocol stack 90.

In one embodiment, the plurality of I/O modules 100 include a serial I/O module, a shared memory module, and a network module. Additional I/O modules 100 may also be included as will be understood by one skilled in the art. The I/O modules 100 are configured to communication over a particular physical medium.

As also shown in the illustrated embodiment, the service modules 110 comprise a system configuration module, a user interface module, a message module, and a radio module. Additional service modules 110 may also be included as will be understood by one skilled in the art. The service modules 110 are configured to process data according to the service, for example, to send and receive SMS messages, to channel voice communications, to facilitate interaction with records in an electronic phonebook, and to manage the operational characteristics of the system, just to name a few. Various additional service modules 110 may also be configured to provide various additional services.

As also shown, the SMART stack 90 comprises a device layer, a communication layer, and a message layer. The device layer is configured to transmit data over a physical medium. The transmitted data are grouped into frames.

The communication layer is configured to perform sequential and reliable transmission of packets, independent of the physical layer and provide peer-to-peer packet transmission between the wireless module and the remote device or control station. The communication layer assembles packets into frames for delivery to the device layer and also disassembles frames received from the device layer into packets. The communication layer is also configured to identify a particular service associated with a set of packets that collectively comprise a message and then send that message to the message layer for processing. In one embodiment, the communication layer may send messages to specific functional modules within the message layer according to the particular service associated with the message.

The message layer is configured to track state information and user data that are communicated between a wireless module 30 and a remote device (not shown). The message layer is additionally configured to identify a message type associated with a message received from the communication layer and create a corresponding communication conforming to the particular service and message type associated with the message.

Figure 5:
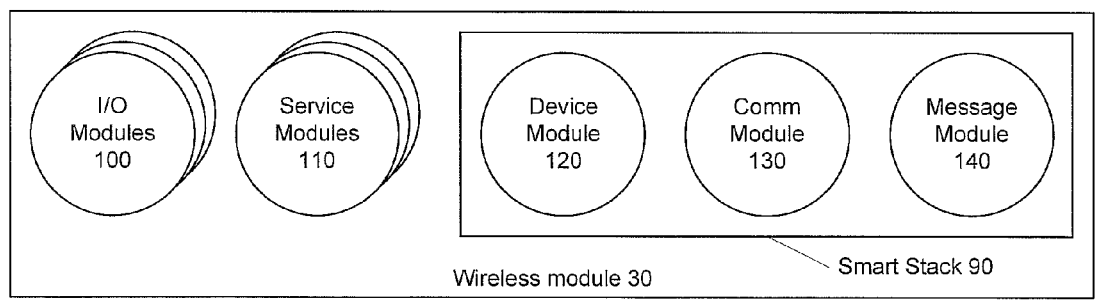
FIG. 5 is a block diagram illustrating an example wireless module according to an embodiment of the present invention.

FIG. 5 is a block diagram illustrating an example wireless module 30 according to an embodiment of the present invention. In the illustrated embodiment, the wireless module 30 comprises a plurality of I/O modules 100, a plurality of service modules 110, and a SMART protocol stack 90. The SMART protocol stack 90 comprises a device module 120 configured to implement the functionality of the device layer previously described with respect to FIG. 4. The stack 90 also includes a communication module 130 configured to implement the functionality of the communication layer previously described with respect to FIG. 4. Additionally, the stack 90 includes a message module 140 configured to implement the functionality of the message layer that was also previously described with respect to FIG. 4. As will be understood by one having skill in the art, the various modules within the wireless module 30 may be implemented in hardware, software, or a combination of hardware and software.

FIG. 6A is a block diagram illustrating a set of example service states according to an embodiment of the present invention. In the illustrated embodiment, the service states include a data services state, a diagnostic services state, and a SMART services state. Advantageously, a control station can cause a remote device to switch from one of these services to another service using simple commands as applied through a wireless module.

FIG. 6B is a flow diagram illustrating an example of state transitions according to an embodiment of the present invention. The state transitions are implemented at the communication layer by the communication module to enable sequential and reliable transmission of data packets.

FIG. 7 is a block diagram illustrating an example device module 120 according to an embodiment of the present invention. In the illustrated embodiment, the device module 120 comprises three interface modules, namely interface__1 module 150, interface__2 module 160, and interface__3 module 170. There may be more or fewer interface modules in alternative embodiments. The various interface modules are each configured to provide the framing mechanism for transmitting packets from the communication layer over a physical interface. For example, there may be one or more direct wired interface modules such as RS-232E, UART, or USB, one or more direct wireless interface modules such as Bluetooth or infrared, one or more shared memory interface modules, and one or more wired or wireless network interface modules. The various interface modules are configured to implement error detection, for example through a cyclical redundancy check, and may also impose a maximum payload size.

FIG. 8 is a block diagram illustrating an example communication module 130 according to an embodiment of the present invention. In the illustrated embodiment, the communication module 130 comprises a packet module 180, a reliability module 190, and a routing module 200. The packet module 180 is configured to assemble data packets into frames for delivery to the device module and transmission over a physical medium. The packet module 180 is also configured to receive frames from the device module and disassemble those frames into packets.

The reliability module 190 is configured to maintain the reliability of communications between peer levels of the wireless module and the remote device or control station, respectively, depending on which the wireless module is communicating with at the time. The reliability module 190 may enable reliability in communications by implementing packet sequencing (e.g., session based sequence numbering), transaction identifiers, flow control, and error detection.

In one embodiment, where there in continuous data transfer between peers (e.g., during streaming), flow control can be imposed on the sender to provide reliability. For example, the receiving peer may send a HOLD or ENABLE command to keep local buffers from being overrun by a streaming sender peer. In an alternative embodiment, a HOLD command may cause the sending peer to start a hold timer such that upon expiration of the timer packet sending may resume. Alternative techniques for implementing reliability will also be apparent to those skilled in the art.

The routing module 200 is configured to identify a service associated with a set of packets that collectively define a message. These message packets are then provided by the routing module to a particular channel module at the message layer that is tasked with handling message for the identified service. For example, a group of packets comprising an SMS message may each include a channel field populated with a moniker or variable that identifies the packet as part of an SMS message. The routing module 200 is advantageously configured to route all of these packets to a channel module at the message layer that is configured to process SMS messages.

FIG. 9 is a block diagram illustrating an example message module 140 according to an embodiment of the present invention. In the illustrated embodiment, the message module 140 comprises three channel modules, namely channel_1 module 210, channel_2 module 220, and channel_3 module 230. There may be more or fewer channel modules in alternative embodiments. The various channel modules are each configured to process messages of a particular type. For example, there may be a channel module for processing SMS messages, a channel module for processing UI messages, a channel module for processing voice messages, a channel module for processing radio messages, and a channel module for processing configuration and control messages, just to name a few. Additional channel modules may also be employed for other specific types of services.

FIG. 10 is a flow diagram illustrating an example process for transparent communication over a wireless network according to an embodiment of the present invention. In one embodiment, the illustrated process may be carried out by a wireless module such as that previously described with respect to FIG. 1. Initially, in step 250 the wireless module receives a message in a first protocol, for example the SMART protocol. The message includes a first message header and a first data payload. Next, in step 255 the wireless module parses the message and then identifies a second protocol, as shown in step 260. The second protocol may be any of a variety of protocols, for example, SMS or a user interface ("UI") protocol. The second protocol may be identified from the first message header or the first data payload.

In step 265 (which could alternatively take place prior to or in parallel with step 260) the wireless module obtains a second data payload from the message. The second data payload may be obtained from the first data payload. Once the second protocol and the second data payload have been obtained, the wireless module constructs a new message, as shown in step 270. The new message advantageously conforms to the second protocol. Next, the data payload of the new message is populated with at least a portion of the second data payload. Some information from the first message header may also be included in the new message. After the new message is completed, it is sent, as illustrated in step 280.

FIG. 11 is a flow diagram illustrating an example process for handling service specific communications according to an embodiment of the present invention. In one embodiment, the example process can be implemented by a communication module such as that previously described with respect to FIG. 8. Initially, in step 350 the communication module receives one or more frames from the device module. Next, in step 355 the communication module disassembles the one or more frames into one or more data packets. Advantageously, each data packet includes a field that identifies the packet as belonging to a particular service. Accordingly, in step 360, the communication module examines each packet to determine its associated service. In one embodiment, packets having the same service are grouped together by the communication module into a message. As shown in step 365, the communication module then sends the packets to a particular channel module that is tasked with handling messages for the identified service.

FIG. 12 is a flow diagram illustrating an example process for constructing a service message according to a message type according to an embodiment of the present invention. In one embodiment, the illustrated process may be carried out by a message module such as that previously described with respect to FIG. 9. Initially, in step 400, the message module receives a message from the communication layer. The message may comprise a plurality of packets. Next, in step 405 the message module identifies a message type for the message. Advantageously, the particular message module is configured to handle all message types for a particular service such as SMS, UI, configuration and control, and the like. Once the message type is identified by the message module, the message module constructs an outgoing service message according to the identified message type. In this fashion, messages received in a SMART protocol format maybe transparently conveyed to the recipient in a native service format such as SMS, voice, radio, or the like.

Figure 13:
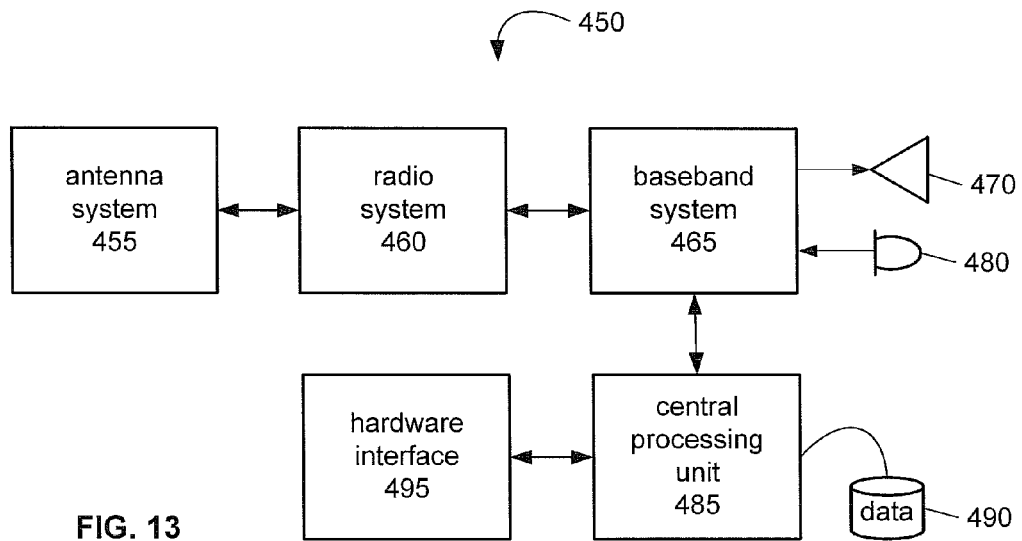
FIG. 13 is a block diagram illustrating an example wireless communication device that may be used in connection with various embodiments described herein.

FIG. 13 is a block diagram illustrating an example wireless communication device 450 that may be used in connection with various embodiments described herein. For example, the wireless communication device 450 may be used in conjunction with a wireless module as described above with respect to FIG. 1. However, other wireless communication devices and/or architectures may also be used, as will be clear to those skilled in the art.

In the illustrated embodiment, wireless communication device 450 comprises an antenna system 455, a radio system 460, a baseband system 465, a speaker 464, a microphone 470, a central processing unit ("CPU") 485, a data storage area 490, and a hardware interface 495. In the wireless communication device 450, radio frequency ("RF") signals are transmitted and received over the air by the antenna system 455 under the management of the radio system 460.

In one embodiment, the antenna system 455 may comprise one or more antennae and one or more multiplexors (not shown) that perform a switching function to provide the antenna system 455 with transmit and receive signal paths. In the receive path, received RF signals can be coupled from a multiplexor to a low noise amplifier (not shown) that amplifies the received RF signal and sends the amplified signal to the radio system 460.

In alternative embodiments, the radio system 460 may comprise one or more radios that are configured to communication over various frequencies. In one embodiment, the radio system 460 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 460 to the baseband system 465.

If the received signal contains audio information, then baseband system 465 decodes the signal and converts it to an analog signal. Then the signal is amplified and sent to the speaker 470. The baseband system 465 also receives analog audio signals from the microphone 480. These analog audio signals are converted to digital signals and encoded by the baseband system 465. The baseband system 465 also codes the digital signals for transmission and generates a baseband transmit audio signal that is routed to the modulator portion of the radio system 460. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 455 where the signal is switched to the antenna port for transmission.

The baseband system 465 is also communicatively coupled with the central processing unit 485. The central processing unit 485 has access to a data storage area 490. The central processing unit 485 is preferably configured to execute instructions (i.e., computer programs or software) that can be stored in the data storage area 490. Computer programs can also be received from the baseband processor 465 and stored in the data storage area 490 or executed upon receipt. Such computer programs, when executed, enable the wireless communication device 450 to perform the various functions of the present invention as previously described. For example, data storage area 490 may include various software modules (not shown) that were previously described with respect to FIGS. 1-5 and 7-9.

In this description, the term "computer readable medium" is used to refer to any media used to provide executable instructions (e.g., software and computer programs) to the wireless communication device 450 for execution by the central processing unit 485. Examples of these media include the data storage area 490, microphone 470 (via the baseband system 465), antenna system 455 (also via the baseband system 465), and hardware interface 495. These computer readable mediums are means for providing executable code, programming instructions, and software to the wireless communication device 450. The executable code, programming instructions, and software, when executed by the central processing unit 485, preferably cause the central processing unit 485 to perform the inventive features and functions previously described herein.

The central processing unit 485 is also preferably configured to receive notifications from the hardware interface 495 when new devices are detected by the hardware interface. Hardware interface 495 can be a combination electromechanical detector with controlling software that communicates with the CPU 485 and interacts with new devices. The hardware interface 495 may be a firewire port, a USB port, a Bluetooth or infrared wireless unit, or any of a variety of wired or wireless access mechanisms. Examples of hardware that may be linked with the device 450 include data storage devices, computing devices, headphones, microphones, and the like.

Figure 14:
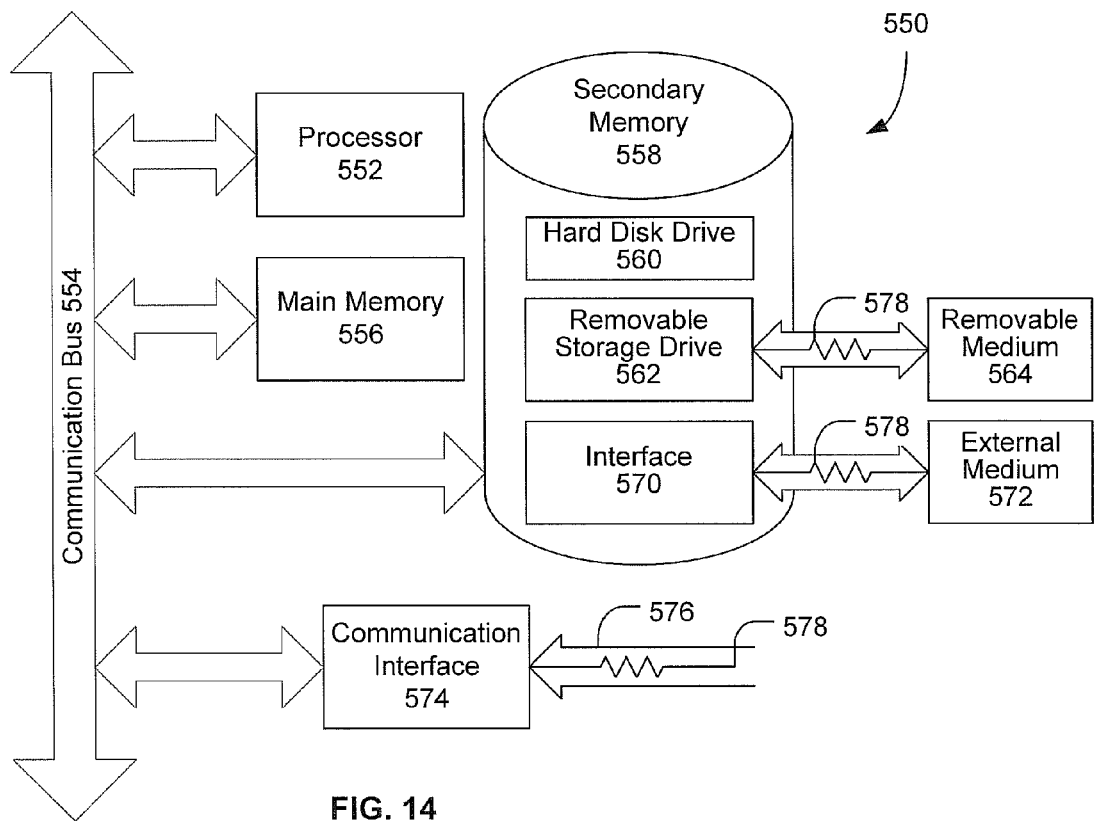
FIG. 14 is a block diagram illustrating an example computer system that may be used in connection with various embodiments described herein.

FIG. 14 is a block diagram illustrating an example computer system 550 that may be used in connection with various embodiments described herein. For example, the computer system 550 may be used in conjunction with a remote device or control station as previously described with respect to FIG. 1. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A computer implemented method for transparent communication between a first device and a second device communicatively coupled via a wireless communication network, comprising:
   receiving a first message conforming to a first protocol from a first device, the first message including a first header information and a first data payload;
   parsing the first data payload to identify:
      a second protocol, wherein the second protocol is a set of standards for exchanging communications,
      a second data payload,
      a service associated with the second protocol, and
      a message type associated with the service;
      wherein the parsing step further comprises obtaining a state from the first data payload, wherein the state is a service state selected from the group comprising a data services state, a diagnostic services state, and a simple modem application reliable transfer services state;
   constructing a second message having a second header information and a second data payload, the second message conforming to the second protocol and the data payload of the second message comprising at least a portion of the first data payload;
   sending the second message to a second device.

2. The method of claim 1, wherein the parsing step further comprises obtaining a network address identifier for the second device from the first data payload.

3. The method of claim 1, wherein the constructing step further comprises providing the identified message type and at least a portion of the first data payload to a channel module, wherein the channel module is designated for processing messages for the identified service.

4. The method of claim 1, wherein the second header information in the second message includes at least a portion of the first data payload.

5. The method of claim 4, wherein the second header information in the second message identifies the first device as the originator of the second message.

6. The method of claim 1, wherein the second header information in the second message excludes information from the first header information in the first message.

7. A wireless communication device communicatively coupled to a first device via a first communication link and communicatively coupled to a second device via a second communication link, the wireless communication device comprising:
   a plurality of input/output modules, each input/output module configured to send and receive frames over a physical medium;
   a device module configured to utilize the plurality of input/output modules to send and receive frames to and from a device over a communication link;
   a communication module configured to assemble data into a frame and deliver the frame to the device module for communication over a communication link, the communication module also configured to disassemble frames received from the device module to obtain data packets conforming to a native protocol and identify a service associated with said data packets;
   wherein the communication module comprises a packet module configured to assemble packets into a frame for delivery to an interface module;
   wherein the packet module is further configured to disassemble frames received from an interface module into packets and identify a service associated with said packets; and
   a message module configured to receive data packets from the communication module and create a message comprising at least a portion of said data packets, said message conforming to a protocol associated with the identified service associated with the received data packets.

8. The system of claim 7, wherein the device module comprises a plurality of interface modules, each interface module configured to manage communications to and from one or more devices via an input/output module.

9. The system of claim 7, wherein the communication module comprises a reliability module configured to dynamically establish communication acknowledgement parameters with a remote device for a communication session.

10. The system of claim 7, wherein the communication module comprises a routing module configured to identify a service associated with a packet and deliver the packet to a particular channel module in the message module, wherein the particular channel module is associated with the identified service.

11. The system of claim 7, wherein the message module comprises a plurality of channel modules, each channel module configured to process messages for a particular service.

12. The system of claim 11, wherein a channel module is further configured to receive a plurality of packets comprising a message from the communication module and identify a message type, wherein the message type is associated with the particular service of the channel module.

13. The system of claim 7, wherein the wireless communication device is configured to transition between a plurality of operational states comprising a data services state, a diagnostic services state, and a reliable transfer state.

14. A computer readable medium having stored thereon one or more sequences of instructions for causing one or more microprocessors to perform the steps for transparent communication between a first device and a second device communicatively coupled via a wireless communication network, the steps comprising:
   receiving a first message conforming to a first protocol from a first device, the first message including a first header information and a first data payload;
   parsing the first data payload to identify,
      a second protocol, wherein the second protocol is a set of standards for exchanging communications,
      a second data payload,
      a service associated with the second protocol, and
      a message type associated with the service;
      wherein the parsing step further comprises obtaining a state from the first data payload, wherein the state is a service state selected from the group comprising a data services state, a diagnostic services state, and a simple modem application reliable transfer services state;
   constructing a second message having a second header information and a second data payload, the second message conforming to the second protocol and the data payload of the second message comprising at least a portion of the first data payload;

sending the second message to a second device.

15. The computer readable medium of claim 14, further comprising instructions wherein the parsing step includes obtaining a network address identifier for the second device from the first data payload.

16. The computer readable medium of claim 14, further comprising instructions wherein the constructing step includes providing the identified message type and at least a portion of the first data payload to a channel module, wherein the channel module is designated for processing messages for the identified service.

* * * * *